(12) United States Patent
Lalam (10) Patent No.: US 10,536,976 B2
(45) Date of Patent: Jan. 14, 2020

(54) METHOD FOR ACCESS TO A COMMUNICATION MEDIUM OF THE CSMA TYPE

(71) Applicant: SAGEMCOM BROADBAND SAS, Rueil Malmaison (FR)

(72) Inventor: Massinissa Lalam, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/061,317

(22) PCT Filed: Dec. 7, 2016

(86) PCT No.: PCT/EP2016/080070
§ 371 (c)(1),
(2) Date: Jun. 11, 2018

(87) PCT Pub. No.: WO2017/102498
PCT Pub. Date: Jun. 22, 2017

(65) Prior Publication Data
US 2019/0045547 A1    Feb. 7, 2019

(30) Foreign Application Priority Data
Dec. 14, 2015    (FR) ...................... 15 62297

(51) Int. Cl.
*H04W 74/08* (2009.01)
*H04W 52/36* (2009.01)
*H04W 84/12* (2009.01)

(52) U.S. Cl.
CPC ....... *H04W 74/0825* (2013.01); *H04W 52/36* (2013.01); *H04W 84/12* (2013.01); *Y02D 70/00* (2018.01); *Y02D 70/1262* (2018.01); *Y02D 70/142* (2018.01); *Y02D 70/164* (2018.01)

(58) Field of Classification Search
CPC .............. H04W 74/0825; H04W 52/36; Y02D 70/142; Y02D 70/00; Y02D 70/1262
See application file for complete search history.

(56) References Cited

U.S. PATENT DOCUMENTS

| | | | |
|---|---|---|---|
| 2008/0146156 A1* | 6/2008 | Makhlouf | H04W 74/0808 455/63.1 |
| 2015/0319700 A1* | 11/2015 | Oteri | H04W 52/28 455/127.1 |
| 2015/0358904 A1 | 12/2015 | Kwon et al. | |

FOREIGN PATENT DOCUMENTS

WO    2015/187860    12/2015

OTHER PUBLICATIONS

International Search Report (w/ English Trans.) and Written Opinion of the ISA for PCT/EP2016/080070 dated Jan. 13, 2017, 14 pages.

* cited by examiner

*Primary Examiner* — Siming Liu
(74) *Attorney, Agent, or Firm* — Nixon & Vanderhye, P.C.

(57) ABSTRACT

The invention relates to a method for adapting the functioning of a device accessing a medium according to a method of the CSMA type, for example Wi-Fi, when interference caused by a device, for example of the LTE type, is detected on the same communication channel, the adaptation of the functioning of the device being able to comprise the lowering of an energy-detection threshold and/or the modification of the functioning of a contention window.

10 Claims, 3 Drawing Sheets

METHOD FOR ACCESS TO A COMMUNICATION MEDIUM OF THE CSMA TYPE

This application is the U.S. national phase of International Application No. PCT/EP2016/080070 filed Dec. 7, 2016 which designated the U.S. and claims priority to FR Patent Application No. 1562297 filed Dec. 14, 2015, the entire contents of each of which are hereby incorporated by reference.

TECHNICAL FIELD

The present invention relates to the field of communication networks, and more particularly a method for access to a medium when interference is detected on this medium. The present invention relates in particular to a method for adapting a device according to a Wi-Fi (wireless fidelity) standard in the presence of interference caused by a device in accordance with an LTE (long-term evolution) standard sharing the same frequency band as the Wi-Fi device.

PRIOR ART

IEEE 802.11 is a set of standards concerning local wireless networks. They are specified in the IEEE (Institute of Electrical and Electronics Engineers) by a working group that bears the same name. A subset of these standards is used as a basis by a body, the Wi-Fi Alliance, in order to produce certification programmes ensuring a certain level of interoperability. An item of equipment certified by the Wi-Fi Alliance can use the mark Wi-Fi. The terms "IEEE 802.11" and "Wi-Fi" will hereinafter be used indifferently to designate the same thing.

IEEE 802.11 (or Wi-Fi) defines protocols (or communication standards) for physical transmission and access to a wireless medium, the medium typically being a channel of a non-licensed frequency band, for example a so-called ISM (industrial, scientific and medical) band. IEEE 802.11 is based on a method for access to the medium of the carrier sense multiple access (CSMA) type with collision avoidance (CA). A CSMA/CA medium-access method, and more generally a CSMA access method, is based on a founding principle that equipment wishing to send a message over the medium must check whether the medium is available before sending the message (the principle of "listen before talk" (LBT)). In order to limit and avoid collisions occurring when items of equipment send messages at the same time over the medium, a so-called "back-off exponential" method is established. This method (illustrated in FIG. 1) describes the method followed by a device using a medium-access method of the ISM type in accordance with IEEE 802.11. Step 100 corresponds to a phase of initialisation of the process, taking place typically when the device must send a message, that is to say a frame or data packet is to be sent over the medium, either immediately after a successful sending or after determination that the medium was busy at the instant of sending of the message. Before being able to transmit this message, the device determines a value of a time counter, this value of the time counter being chosen randomly in a time interval referred to as the "contention window" (Fc). Then, in following steps 120 and 160, the device listens on the medium. If the medium is busy (step 160), the value of the time counter is frozen, otherwise the value of the time counter is decremented. Possibly, the value of the time counter is expressed in the form of a given number of time slots. At the expiry of the time counter, the message is sent in a step 130. If an acknowledgement (ACQ) is received (step 140) then the message is considered to be received, and the method ends (step 150). If no acknowledgement is received (step 140), the message is not considered to be received and must be re-sent (return to step 110). In this new implementation of step 110, the device increases the size of the contention window (typically the size of the contention window is doubled at each implementation of step 110, up to a predefined maximum value). Then the device chooses a new time-counter value in this new time interval defined by the contention window of increased size. Steps 110, 120, 130 and 140 are repeated until there is correct transmission of the message. When a new message is sent, the method recommences at step 100, the value of the contention window being reinitialised to its initial value. It should be noted that, when the method is executed, when the size of the contention window has reached its predefined maximum value, this predefined maximum value is preserved for a certain number of attempts at transmission of the message before possibly being reinitialised to its initial value by the device. It should also be noted that an additional step 125 of the RTS-CTS (ready to send/clear to send) type may be performed in order to reduce risks of collisions when a message is transmitted.

In this method, according to IEEE 802.11, the medium is considered to be busy if:
- any signal with a power above a first power threshold denoted "CCA-ED" (clear channel assessment-energy detection) is detected by the device, or
- a signal in accordance with IEEE 802.11 with a power higher than a second power threshold referred to as minimum sensitivity, denoted "CCA-SD" (clear channel assessment-signal detection) is detected by the device.

Typically a value of the first power threshold CCA-ED is −62 dBm and a value of the second power threshold CCA-SD is −82 dBm.

When a plurality of devices in accordance with IEEE 802.11 are operating on the same medium, this access method in general proves to be effective and equitable for sharing the medium between the various devices, that is to say for equitable sharing of the bandwidth available for the sending of messages by each device.

It is at the present time envisaged that devices in accordance with standards of the LTE type (long-term evolution, the evolution of so-called "4G" mobile telephony standards) can use the same ISM non-licensed frequency bands. Devices using these two standards—IEEE 802.11 and LTE—must then share the same medium, which poses a problem of equitable sharing of the medium between devices using different communication standards.

Some LTE standards use a medium-access method similar to IEEE 802.11. Thus, though the so-called LTE-LAA (Licensed-Assisted Access for Unlicensed Spectrum) standards, defined by the 3GPP ($3^{rd}$ Generation Partnership Project) organisation use a medium-access method of the "listen before talk" (LBT) type, this is not the case with the LTE-U (LTE in unlicensed spectrum) standard defined by the LTE-U forum.

Thus a device in accordance with the LTE-U standard defines functioning where a device alternates between periods of continuous sendings and periods without sending (duty cycle). During the sending period, the LTE-U device monopolises access to the medium, without the possibility of sharing of the medium access with another device such as an IEEE 802.11 device during this time.

Though the LTE-LAA standard does indeed introduce a medium-access method of the LBT type, implementation of the LBT method is however different. Thus the standard defined by 3GPP known as "LTE-LAA cat3" uses a contention window of frozen or fixed size, rather than variable as in the IEEE 802.11 standards. It corresponds to option B of the standard defined by the ETSI (EN 301 893 v1.8.1-2015-03). Another use of this standard defined by the 3GPP known as "LTE-LAA cat4" does indeed use a contention window of variable size in a way similar to IEEE 802.11, but however the size of the contention window varies according to a criterion other than the non-acknowledgement of a message transmitted and its size is reinitialised to its initial value after it has reached its maximum value. It corresponds to option A of the standard defined by the ETSI (EN 301 893 v1.8.1-2015-03). There again, devices using a communication standard of the LTE-LAA (cat3 or cat4) type will have a tendency to monopolise a bandwidth available on the medium to the detriment of devices implementing IEEE 802.11 standards.

The document WO 2013/112983 proposes a method allowing the coexistence of different radio communication technologies on the same frequency band, but this document is based on a need for cooperation between the systems concerned. The prerequisite is particularly constraining, requiring the solution to be deployed on both systems.

The documents US 2013/0343288 and US 2015/0215100 propose solutions for improving the coexistence between the LTE and IEEE 802.11 systems, but these solutions are implemented only on systems of the LTE type. These solutions do however favour LTE communications and leave a Wi-Fi system without any defense in the face of an interfering LTE system not using these solutions.

It is therefore desirable to propose a method for adapting a method for access to a medium in accordance with a standard of the IEEE 802.11 type used by a first device when other devices using a standard of the LTE type have access to the same medium.

DISCLOSURE OF THE INVENTION

To this end, a method is proposed for access to a wireless communication medium, the access being of the "carrier sense multiple access" (CSMA) type, wherein a device, referred to as the sending device, wishing to send a message over said medium checks whether said medium is available before sending said message, the medium being busy when a signal coming from another device and detected by said sending device has a power higher than a predetermined power threshold.

The method comprises, when it is executed by a first device, the following steps: determining a proportion of a first observation period during which the first device detects an interfering signal with a power higher than said power threshold, the interfering signal being sent by a second device accessing the medium, and, if said proportion is higher than a predefined value, then modifying the value of the power threshold by lowering it.

Advantageously, lowering the value of the power threshold enables the device implementing the adaptation method to be more sensitive to the signals detected on the medium. Thus a device implementing the invention is more sensitive to the presence of signals on the medium and will not attempt to send a message that would probably not have been correctly received by the destination device.

According to a complementary embodiment of the invention, the method for access to the communication medium using a contention window, with a size that may vary between an initial size and a maximum size greater than the initial size, for sending a message, each message sent according to the medium-access method by a sending device comprising a preamble, the interfering signal not corresponding to such a message comprising a preamble, the method comprises the following subsequent steps: determining, during a second observation period, a first cumulative duration during which the interfering signal is detected on the medium with a power higher than the modified value of the power threshold, determining, during the second observation period, a second cumulative duration during which the size of the contention window is greater than its initial size, determining the type of the interfering signal by comparison of the first cumulative duration and the second cumulative duration.

Advantageously, the device can characterise the source of the interferences by comparison of a first cumulative duration representing a time relating to interferences coming from devices not in accordance with the medium-access method with a second cumulative duration representing a time relating to interferences coming from devices implementing an identical medium-access method.

According to a complementary embodiment of the invention, the method for access to the communication medium comprising a step of acknowledgement of a sent message, the method for access to the communication medium comprises the following subsequent steps: determining a mean duration that elapses between a moment where the first device takes a decision to send a message and a moment where said message is acknowledged, if the value of the mean duration is greater than a predefined value, and, if the previously determined interfering signal is of a first predetermined type, then modifying management of the contention window used, so as to fix the size of the contention window or to reinitialise the size of the contention window to its initial value when a predefined size is reached.

Advantageously, adapting the management of the contention window makes it possible to establish management of this contention window similar to the medium-access method of the device causing the interference and therefore to re-establish equilibrium in the sharing of access to the medium.

According to a complementary embodiment of the invention, the method for access to the communication medium further comprises the following steps: if the value of the mean duration is greater than a predefined value and if the previously determined interfering signal is not of said first type, then sending a message to a third device, the message comprising a request for information on the implementation of the method for access to the communication medium by the second device and, from a message received in response to said message comprising a request for information, determining whether the source of interference uses the present method for access to a communication medium.

According to a complementary embodiment of the invention, the medium is a medium of the radio type.

According to a complementary embodiment of the invention, the method for access to the communication medium is in accordance with a communication standard of the IEEE 802.11 type as long as the power threshold or the management of the contention window is not modified.

According to a complementary embodiment, the method for access to the communication medium further comprises the following step, when the power threshold or the management of the contention window is modified, of sending a message indicating that interference has been detected on the medium, the message comprising the modified value of the power threshold or an indication of the modification of the contention window, the sending of the message taking place periodically or following the reception of a request.

The present invention also relates to a device comprising means for access to a wireless communication medium, the access being of the "carrier sense multiple access" (CSMA) type, in which a device, referred to as the sending device, wishing to send a message over said medium, checks whether said medium is available before sending said message, the medium being busy when a signal coming from another device and detected by said sending device has a power higher than a predetermined power threshold. The device comprises means for determining a proportion of an observation period during which the device detects an interfering signal with a power higher than the power threshold, the interfering signal being sent by another device accessing the medium, and means for modifying the value of the power threshold by lowering it if this proportion is higher than a predefined value.

The present invention also relates to a computer program, comprising instructions for the implementation, by a processor, of the method for access to the communication medium according to the invention, when said computer program is executed by said processor.

The present invention also relates to storage means storing said computer program.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

Figure 2:
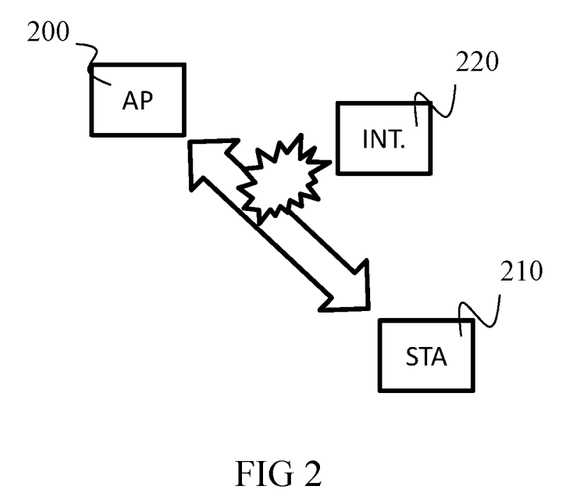
FIG. 2 is a schematic representation of an example of a system implementing a method for adaptation, according to an embodiment of the invention, to a source of interference included in a method for access to a medium of the CSMA type, for example IEEE 802.11.

FIG. 2 is a schematic representation of an example of a system implementing the method for adaptation, according to an embodiment of the invention, to a source of interference included in a method for access to a medium of the CSMA type, for example IEEE 802.11. Devices 200 and 210 are able to implement a communication standard in accordance with an IEEE 802.11 standard or Wi-Fi certified devices. These devices can therefore communicate, that is to say send and receive messages, via a medium, this medium being a radio-frequency band. This frequency band is typically a frequency band not requiring a license for use thereof, for example a so-called ISM frequency band. The frequency band is possibly divided into various channels, each channel being able to be used by the devices 200 and 210. The device 200 is typically a Wi-Fi access point (AP), for example a device comprising routing functions and at least means for connection to another communication network, for example an internet connection via an xDSL (digital subscriber line) access. The device 210 is typically a station (STA), that is to say an item of equipment able to connect via a Wi-Fi connection to a Wi-Fi access point such as the device 200. According to a complementary embodiment, the devices 200 and 210 are both Wi-Fi access points or both Wi-Fi stations, for example connected directly via a so-called ad hoc connection. A Wi-Fi network is spoken of when a plurality of devices, such as the devices 200 and 210, are connected together by Wi-Fi technology. A Wi-Fi (or IEEE 802.11) network comprises an access point (device 200) and a plurality of stations such as the device 210, a given Wi-Fi network being identified by an SSID (service set identifier) parameter.

A device 220 comprises at least one communication interface in accordance with an LTE or 4G standard. Possibly, this LTE standard allows the use of the unlicensed frequency band used by the devices 200 and 210 for communicating in Wi-Fi. The device 220 is therefore a source of interference (INT) for the Wi-Fi communications when it is sending in accordance with the LTE standard on the same channel as the one that is used by the devices 200 and 210. In other words, the device 220 interferes with the communications between the devices 200 and 210 when it sends messages. The sending of a message means the sending by the device 220 of a signal in accordance with the LTE standard over the common channel, this so-called LTE signal interfering with the Wi-Fi communications between the items of equipment 200 and 210.

Figure 3:
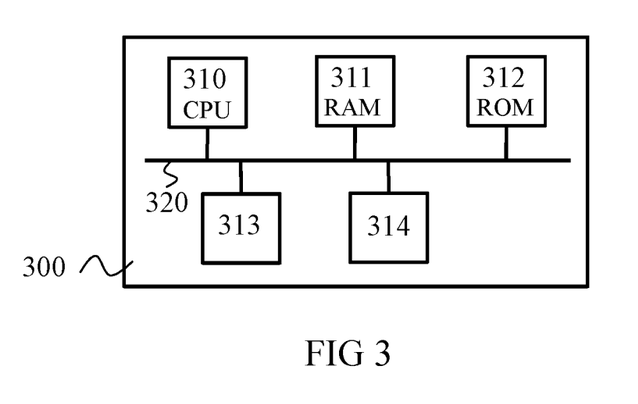
FIG. 3 is a schematic illustration of an example of hardware architecture of a device able to implement the invention.

FIG. 3 illustrates schematically an example of hardware architecture of a device 300. The device 300 is the device 200 or the device 210 of FIG. 2. The device 300 comprises, connected by a communication bus 320: a processor or CPU (central processing unit) 310; a random access memory (RAM) 311; a read only memory (ROM) 312; a storage unit or a storage medium reader, such as an SD (secure digital) card reader or a hard disk drive (HDD) 313; and at least one network interface or radio module 314 enabling the device 300 to access a medium, for example of the radio-frequency type. The network interface 314 may be in accordance with IEEE 802.11 communication standards and thus enable the device 300 to access a so-called ISM frequency band in order to connect to other devices implementing this same standard. The network interface 314 can thus access various predefined channels within a frequency band and exchange messages with other compatible devices, that is to say send messages to another device and receive messages from this other device.

The processor 310 is capable of executing instructions loaded into the RAM 311 from the ROM 312, from a memory or storage medium, internal or external, 313, or from a communication network via the network interface 314. When the device 300 is powered up, the processor 310 is capable of reading instructions from the RAM 311 and executing them. These instructions form a computer program enabling the implementation or the execution, by the processor 310, of all or some of the modules, methods and steps described in the present document.

Thus all or some of the modules, methods and steps described in the present document may be implemented in software form by the execution of a set of instructions by a programmable machine, such as a DSP (digital signal processor) or a microcontroller. All or some of the modules, methods and steps described hereinafter may also be implemented in hardware form by a machine or a dedicated component, such as an FPGA (field-programmable gate array) or an ASIC (application-specific integrated circuit).

Figure 4:
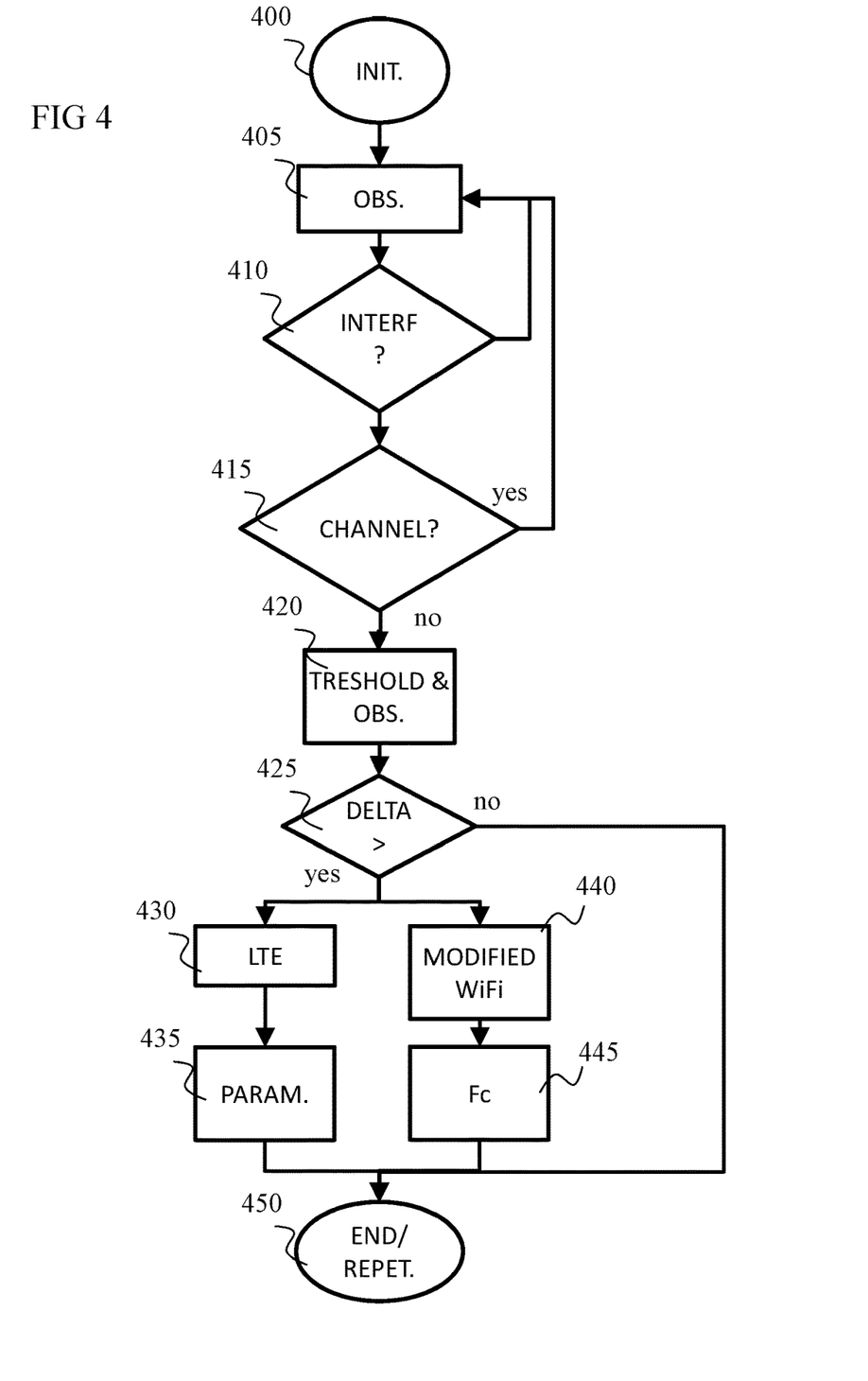
FIG. 4 is an illustration of a method, according to an embodiment of the invention, for adaptation to a source of interference of a method for access to a medium of the IEEE 802.11 type.

FIG. 4 is an illustration of a method, according to one embodiment of the invention, for adaptation to a source of interference of a method for access to a medium of the IEEE 802.11 type. The method is implemented by the device 300, which may be the device 200 or the device 210 in FIG. 2, the devices 200 and 210 exchanging messages in accordance with IEEE 802.11 over a medium, for example a first channel of a frequency band.

A first step 400 is a step of initialisation of the adaptation method. The adaptation method may be initiated in accordance with various criteria. According to one embodiment of the invention, the method is initiated when the device 300 finds for example that its transmission rate drops or that a transmission quality decreases. According to one embodiment of the invention, the method is initiated periodically or after reception of a request coming from another device, the request comprising information indicating that the adaptation method must be initiated. According to one embodiment of the invention, the method is implemented continuously by the device 300, that is to say the steps described below, particularly the steps comprising parameter-evaluation phases, can be carried out continuously.

A step 405 is a phase of observation of the medium. This observation phase is implemented during a first observation period $T_{obs1}$. $T_{obs1}$ is typically around a few seconds. According to one embodiment of the invention, as previously stated, this observation phase may be implemented in isolation or periodically. According to an alternative embodiment of the invention, the observation phase is implemented continuously over a sliding time window with a duration equal to the first observation period $T_{obs1}$. During this observation phase, the device 300 determines a duration $T_{ED1}$. The duration $T_{ED1}$ is a total duration counting for how much time a signal not in conformity with IEEE 802.11 is detected on the medium during the observation period $T_{obs1}$. IEEE 802.11 provides for a message sent in conformity with the standard to comprise a preamble. Thus each message sent in accordance with the method for access to the medium by a sending device comprises a preamble. A signal not comprising such a preamble is considered to be non-conforming. A signal not conforming to IEEE 802.11 is considered to be detected if it has a power captured by the device 300 higher than the first power threshold CCA-ED, that is to say typically −62 dBm. This total duration $T_{ED1}$ corresponds to the total duration during which a signal other than Wi-Fi (or IEEE 802.11) is detected on the medium during the observation phase, this signal having a measured power higher than the power threshold CCA-ED.

The device 300 determines, during this same first observation period $T_{obs1}$, the total duration $T_{CW}$ during which the size of the contention window of the device 300 is greater than its initial size. The size of the contention window varies according to the principles of IEEE 802.11 described above. This duration $T_{CW}$ is determined thus:
- starting of a time counter at the time of the first increase in the size of the contention window caused by the non-reception of an acknowledgement following a first sending of a message,
- stoppage of the time counter when the size of the contention window is reinitialised to its initial size.

The size of the contention window is reinitialised to its initial size after reception by the device 300 of an acknowledgement, signifying that the message sent was indeed received, or when a predetermined number of retransmissions of the message has been reached.

$T_{CW}$ is the total time measured by the time counter, a time counter that can be started and stopped a plurality of times during the first observation period $T_{obs1}$. $T_{CW}$ corresponds to a total time during the first observation period $T_{obs1}$ during which the device 300 is awaiting acknowledgement of a resending of a message following a first sending of the non-acknowledged message. One or more resendings may then take place. This situation may in particular arise when interference disturbs the sending of the messages by the device 300. In the presence of a device 300 implementing a standard according to IEEE 802.11 comprising technology of the RTS-CTS type described during step 125 in FIG. 1, it is then highly probable that the interference is due to at least one interfering device not in conformity with this IEEE 802.11 standard and therefore possibly that this interfering device is in accordance with a standard of the LTE type using the same medium.

The device 300 determines an interference time $T_{INT}$ as being the sum of $T_{ED1}$ and $T_{CW}$:

$$T_{INT}=T_{ED1}+T_{CW}$$

It should be noted that the interference time $T_{INT}$ may be greater than $T_{obs1}$ since $T_{ED1}$ and $T_{CW}$ may overlap.

According to alternative embodiments of the invention, the device 300 may use $T_{INT}=T_{ED1}$ or $T_{INT}=T_{CW}$ as the interference time rather than the sum of the two parameters $T_{ED1}$ and $T_{CW}$.

In a step 410, the device then determines a first ratio $R_{INT}$ between the interference time $T_{INT}$ and the first observation period $T_{obs1}$:

$$R_{INT}=T_{INT}/T_{obs1}$$

The device 300 determines whether this ratio $R_{INT}$ is greater than or equal to a predefined value $R_{threshold1}$. If such is the case, the device 300 considers that interference is present on the medium and that this interference is possibly of type LTE. According to one embodiment of the invention, a first correction mechanism is implemented in a following step 415. If $R_{INT}<R_{threshold1}$, the device 300 recommences an observation step 405, possibly after a pause time. Alternatively, the observation phase implemented during step 405 may be implemented continuously, as well as the evaluation of the value $R_{INT}$, the observation phase taking place over a sliding time window of size $T_{obs1}$.

According to one embodiment of the invention, the device 300 sends a message comprising at least one item of information indicating that interference has been detected on the channel. This message may comprise the values of the various parameters calculated by the device 300. The device 300 may send this message to the devices with which it is in communication, that is to say to the stations connected in the case where the device 300 is an access point, or to the access point to which the device 300 is connected in the case where the device 300 is a station. The message may also be sent following the reception of a message comprising a request received from another device. A device receiving such a message comprising information indicating the presence of interference on the channel may record this information in association with said channel, possibly during a predefined period.

If $R_{INT}$ is greater than or equal to $R_{threshold1}$, the device 300 attempts to change the transmission channel in a step 415 in order to switch to a channel without interference. Depending on whether the device 300 is an access point 200 or a station 210, the channel-change step 415 may be carried out differently.

If the device 300 is an access point, the device 300 may select a different channel among various possible channels in the frequency band. The device 300 then uses known criteria for selection of a new channel. According to one embodiment of the invention, the device 300 adds to the known selection criteria at least one criterion based on information received from other devices indicating detection of interference according to the present method and previously stored. If a new channel is selected, the device 300 sends a message to connected stations, the message comprising information on the change of communication channel and possibly a reason for this change. The device 300 for this purpose sends a frame as described in IEEE 802.11-2012 at Part 8.4.2.21, possibly supplemented by a field comprising the reason for the change of channel. The change of channel is next implemented by the access point after a predetermined period known to the stations.

If the device 300 is a station, according to one embodiment of the invention, the device 300 seeks to connect to the access point using another channel if the access point offers this possibility (plurality of channels available at the same time). According to another embodiment of the invention, the device 300 seeks to connect to another access point using another channel. Possibly, if the device 300 disconnects from an access point, a message is sent to this access point comprising information on the reason for the disconnection, indicating for example a level of interference detected, the interference level being determined for example according to the ratio $R_{INT}$. According to one embodiment of the invention, the device 300 also indicates, at the time of connection to a new access point, the reason for its connection, that is to say a channel with interference has been detected. The device 300 for this purpose sends a frame, referred to as a management frame, as described in IEEE 802.11-2012, part 8.3.3, supplemented by a field indicating the cause for the change of channel. More particularly, a frame referred to as an association frame, or a frame referred to as a deassociation frame, defined in IEEE 802.11-2012, Parts 8.3.3.4 and 8.3.3.5, may be sent, further comprising information indicating the reason for the change of channel. According to one embodiment of the invention, a plurality of elements are included in association with the information indicating the reason for the change of channel, for example at least one of the parameters that gave rise to the taking of the decision to change channel (values of CCA-ED, $T_{ED1}$, $T_{CW}$, $T_{INT}$, $T_{obs1}$, $R_{threshold1}$, $R_{INT}$, etc.). A device that receives such messages may record the information received, for example in association with the channel concerned.

If it is not possible to change channel, or if the change of channel does not solve the interference problem, then a step 420 of characterisation of the interference source is implemented. Step 420 comprises a first action of modification by the device 300 of the value used for the parameter CCA-ED, the modification consisting of a reduction of this value. The parameter CCA-ED corresponds to a first power threshold. As described previously, the device 300 wishing to transmit a message and detecting a signal with a power higher than the value of the parameter CCA-ED on the channel deduces from this that the channel is busy and defers the transmission of a message to be sent. Reducing the value of the parameter CCA-ED makes it possible to prevent the device 300 sending a message while a signal, with a power lower than the initial value of the parameter CCA-ED, that is to say −62 dBm, is detected on the channel, knowing that very probably this signal will interfere with the transmission of the message. According to one embodiment of the invention, the new value of CCA-ED is chosen identical to the value of the minimum sensitivity CCA-SD, that is to say −82 dBm. The device 300, from step 420, therefore implements a communication standard in accordance with IEEE 802.11, while however modifying the value of the parameter CCA-ED, normally fixed at −62 dBm, by a lower value, typically −82 dBm. The device 300 may send a message comprising information indicating that it is implementing IEEE 802.11 with a modified value of CCA-ED, the message comprising this modified value. The device 300 may send this message periodically or integrate this information in addition in a message sent regularly, for example a so-called "beacon" message if the device 300 is an access point.

Reducing the value of CCA-ED, for example to −82 dBm, advantageously enables the device 300 to cohabit better with a device of the LTE-U type, the device 300 not attempting to send a message during the sending slots of the LTE-U device.

At the same time, during step 420, the device 300 determines a new value of a cumulative duration $T_{ED2}$, determined in a similar fashion to the cumulative duration $T_{ED1}$, but using the new value of CCA-ED modified for determination of the cumulative duration $T_{ED2}$. According to one embodiment of the invention, the value of the cumulative duration $T_{ED2}$ is determined over a second observation period $T_{obs2}$ different from the first observation period $T_{obs1}$. During step 420, the device 300 determines the cumulative duration $T_{ED2}$ during which a signal not in conformity with an IEEE 802.11 standard is detected on the medium, this signal having a power captured by the device 300 higher than the new modified power threshold CCA-ED, that is to say possibly −82 dBm. This cumulative duration $T_{ED2}$ corresponds to the cumulative duration during which a signal other than Wi-Fi (or IEEE 802.11) is detected on the medium during the second observation period $T_{obs2}$, this signal having a measured power higher than the new modified power threshold CCA-ED. The cumulative duration $T_{ED2}$ is a representation of the time of occupation, during the observation period $T_{obs2}$, of the medium by a device not in conformity with an IEEE 802.11 standard, that is to say probably an LTE device operating on the same channel as the one used by the device 300. During the second observation period $T_{obs2}$, the device 300 also determines the change over time in the time periods during which a signal not in conformity with an IEEE 802.11 standard is detected on the medium, in addition to adding them together in order to determine $T_{ED2}$. Several cases are possible:
  if the change over time during the observation period $T_{obs2}$ in the power of the signal not in conformity with IEEE 802.11 is of the rectangular periodic type, with one period characterised by a signal with a relatively strong power level and another period characterised by a weak or even zero power level, then a device 300 can conclude from this that the interfering device is probably of the LTE-U type;
  if the change over time during the observation period $T_{obs2}$ in the power of the signal not in conformity with IEEE 802.11 is not of the rectangular periodic type, but the value of the parameter $T_{ED2}$ is higher than a predetermined threshold value $T_{threshold2}$, then the device 300 can conclude from this that the interfering device is probably of the LTE-LAA (cat3 or cat4) type.

According to one embodiment of the invention, the device 300 implements methods complementary to the analysis of the change over time in the power of the interfering signal in order to determine the type of device giving rise to the interference.

For example, the device 300 sends a request to other devices, implementing the present method, and with which it can get into communication in order to in return receive information on possible interfering devices detected. If the device 300 is an access point, it can thus send a request to connected stations or other access points close by.

According to one embodiment of the invention, the device 300 sends a request to a first server, the first server comprising a database comprising a list of devices present in the near environment of the device 300, as well as of the type of radio technology that they use, or may use. In other words, each device in the list is associated with a type of technology or method of access to the medium (for example Wi-Fi, Wi-Fi modified in accordance with the method of the present invention, LTE-U, LTE-LAA cat3, LTE-LAA cat4, etc.). Near environment means for example within radio transmission or reception range of the device 300. The device 300 can thus in return receive a list of interfering devices. However, it may be difficult to guarantee completeness or to keep such a list up to date, a Wi-Fi or LTE device frequently being a device that is by nature mobile.

According to one embodiment of the invention, the device sends the message to the first server with information concerning its geographical position, obtained via a positioning module (for example GPS—global positioning system) included in the device 300. The device 300 can thus deduce from its geographical location what type of LTE device is liable to be in its vicinity (LTE-U is for example an LTE standard mainly present in the United States).

According to one embodiment, the device 300 comprises a radio module in accordance with an LTE standard and can via this radio module recover information on devices transmitting in accordance with the LTE standard located in the vicinity of the device 300.

The device 300, once it has determined the probable type of interfering LTE device, can send a message comprising this information. The message may for example be of the beacon type and broadcast by the device 300. According to one embodiment, a reliability indicator, of the probability type, is associated with this information, corresponding to a degree of confidence that the device 300 gives to the determination of the type of interfering device.

According to a complementary embodiment of the invention, the device 300 determines a value of a cumulative duration $T_{RAT}$. $T_{RAT}$ corresponds to a cumulative duration during the second observation period $T_{obs2}$ during which a signal corresponding to an IEEE 802.11 standard sent by the device not belonging to the same IEEE 802.11 network as the device 300 is detected with a power greater than CCA-SD. The cumulative duration $T_{RAT}$ therefore corresponds to a cumulative duration during the second observation period $T_{obs2}$ during which at least one device of another Wi-Fi network interferes with the device 300. A comparison of the values of the cumulative durations $T_{ED2}$ and $T_{RAT}$ enables the device 300 to determine whether the source of interference is mainly of the LTE type (the value of the cumulative duration $T_{ED2}$ is higher than the value of the cumulative duration $T_{RAT}$) or mainly of the IEEE 802.11 type (the value of the cumulative duration $T_{RAT}$ is higher than the value of the cumulative duration $T_{ED2}$).

In a subsequent step 425, the device 300 determines whether complementary measures for adapting the method of access to the medium must be implemented. The device 300 determines a mean period DELTA that elapses between the moment when the device 300 takes a decision to send a message (FIG. 1, step 100) and the moment when this message is actually sent (FIG. 1, step 130, the message being considered to be actually sent when an acknowledgement is received in return), this mean period DELTA being calculated for example for all the messages sent during the second observation period $T_{obs2}$.

Figure 1:
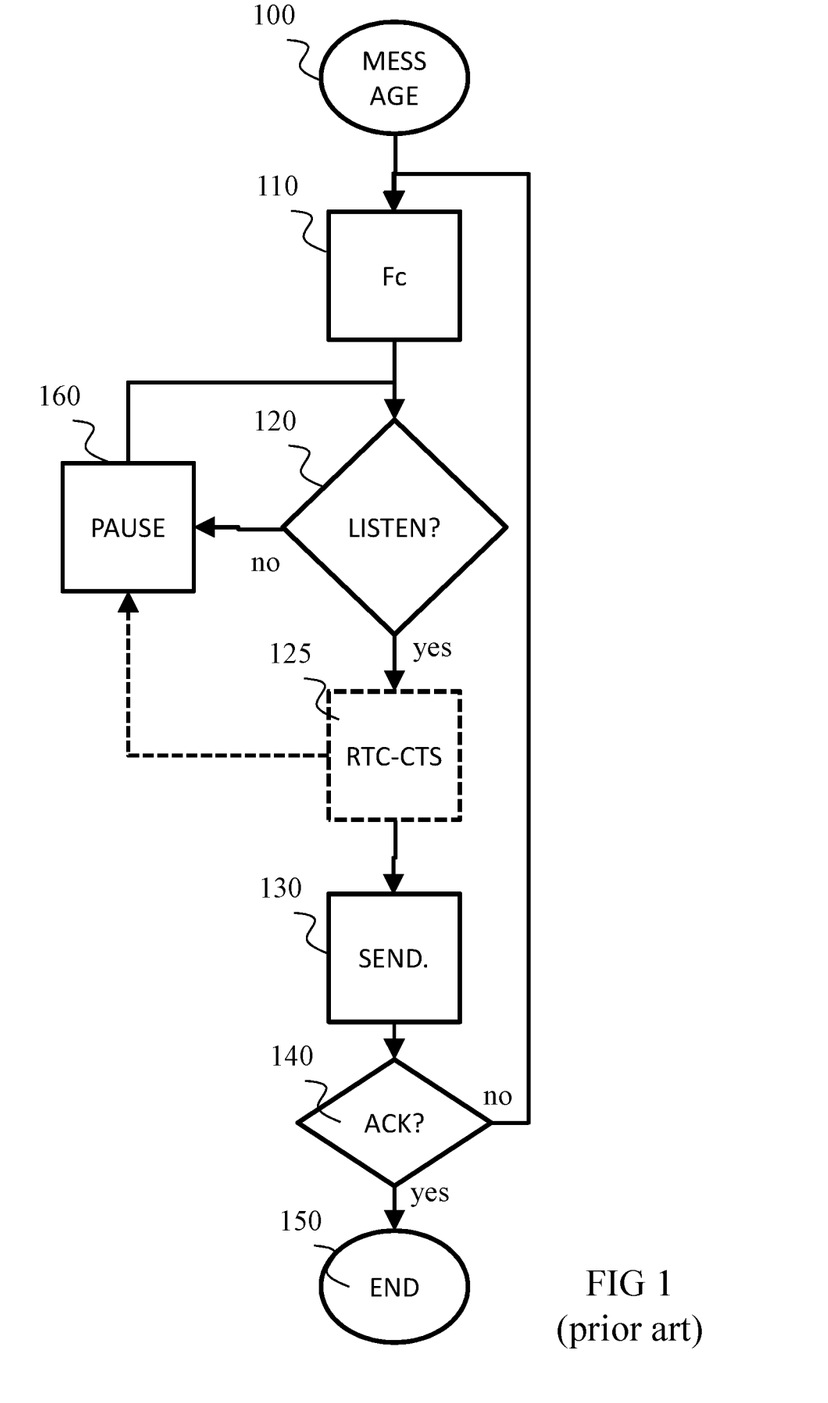
FIG. 1 is a schematic illustration of a known method for access to a medium in accordance with IEEE 802.11.

DELTA=Mean ($T_{ack}-T_{tx}$-Sum (Bn·$T_{slot}$), with, for each message sent during the observation period $T_{obs2}$:

$T_{ack}$ represents a moment when an acknowledgement of the message sent is received by the device 300 after sending thereof (step 130), $T_{tx}$ represents a moment when the device 300 receives the message to be sent (step 100), Bn·$T_{slot}$ corresponds to the value of the time counter chosen randomly in the interval of time known as the "contention window" for the $n^{th}$ sending of the message (n>0, there is sending of the same message as long as there is no receipt of acknowledgement of said message); this value can be represented by a number Bn of time slots multiplied by a duration Toot of a time slot defined in accordance with the IEEE 802.11 standard used;

Mean(x) is a function calculating a mean from a plurality of values of x; this mean may be a mean weighted according to various criteria, for example whether quality of service (QoS) criteria are used for sending messages, Sum (x) is a function calculating the sum of a plurality of values of x.

The device 300 compares this value DELTA with a predefined threshold $DELTA_{threshold3}$ and, if the value of DELTA is higher than this predefined threshold $DELTA_{threshold3}$, the device 300 decides that corrective actions must be taken to compensate for the effect of the interferences detected. These corrective actions are described in steps 430, 435, 440, 445. Otherwise the device 300 passes to a step 450.

In step 430, if $T_{ED2}$ is greater than $T_{RAT}$, or more generally if the device 300 determines that the main source of interference is a device of the LTE-LAA type, then the device 300 implements suitable corrective measures. In step 435, the device 300:

modifies the size of the contention window used according to IEEE 802.11, deciding to freeze (or fix) this size at a predefined size, for example the initial size of the contention window. This modification is particularly advantageous if the interfering device is of the LTE-LAA cat3 type, the LTE standard also using a contention window of fixed size. According to one embodiment of the invention, the device 300 deduces the new fixed size of the contention window to be used from the type of LTE-LAA cat3 standard identified, for example by seeking this information in a database, or modifies the method of reinitialisation of the contention window used. For example, the device 300 decides to reinitialise the size of the contention window to its initial value when a message has not yet been acknowledged provided it reaches a predefined size, typically a so-called maximum size according to IEEE 802.11. This modification is particularly advantageous when the interfering device is of the LTE-LAA cat4 type.

According to a complementary embodiment of the present invention, the device 300 alternatively implements the two modifications described previously and determines, for each modification, a new value of the mean duration DELTA. The device 300 can then decide to implement whichever of the two modifications makes it possible to obtain the lowest DELTA value. The device 300 may periodically test each of the modifications and check which modification leads to the lowest DELTA value.

According to one embodiment of the invention, the device 300 of the access point type integrates information, indicating the modification made, in the message of the "beacon" type sent periodically.

According to one embodiment of the invention, the device 300 sends a message to a second server, the second server possibly being the first server, the message comprising information on the modifications made to the functioning of the IEEE 802.11 standard used and possibly means for locating it geographically.

According to one embodiment of the invention, the device 300 sends a message comprising at least one item of information indicating that interferences have been detected on the channel and that possibly modifications have been made. A plurality of elements may be included in association with the information, for example at least one of the parameters that gave rise to the taking of a decision to modify (values of CCA-ED, $T_{ED1}$, $T_{CW}$, $T_{INT}$, $T_{obs1}$, $R_{threshold1}$, $R_{INT}$, $T_{ED2}$, $T_{RAT}$, DELTA, etc.). A device that receives such messages may record the information received, for example in association with the channel concerned. The device 300 may send this message to the devices with which it is in communication, that is to say to the stations connected in the case where the device 300 is an access point, or to the access point to which the device 300 is connected in the case where the device 300 is a station. The message may also be sent following the reception of a message comprising a request received from another device. A device receiving such a message comprising information indicating the presence of interference on a channel may record this information in association with said channel, possibly during a predefined period.

In other words, according to one embodiment of the invention, when the power threshold or the management of the contention window is modified, the device 300 sends a message indicating that interferences have been detected on the medium, the message comprising the modified value of the power threshold or an indication of the modification of the contention window. The device 300 may send this message periodically or on demand, following the reception of a request.

It should be noted that, if mechanisms of the "quality of service" type are used by the device 300, then the modifications made may be different for each quality of service. In other words, if the device 300 uses a different management of the contention window depending on the type of message to be sent, then the modification made to the management of the contention window (fixed size or different moment of reinitialisation of its size) may also be adapted according to the type of message.

In a step 440, if $T_{RAT}$ is greater than $T_{ED2}$, or more generally if the device 300 determines that the main source of interference is a device of the IEEE 802.11 type, then the device 300 can take suitable corrective measures in steps 440 and 450.

In a step 440, the device 300 determines first of all whether the main source of interference is caused by a device implementing the method described in the present document, that is to say if the interfering device uses a modified version of IEEE 802.11 (cf. possible modifications described during step 435).

For this purpose, the device 300 can analyse messages of the "beacon" type sent by the interfering device, these messages being able to comprise information on the implementation of modifications to the IEEE 802.11 standard.

If such is the case, then, in a step 450, the device 300 can make the same modifications to the IEEE 802.11 standard or send a message to the interfering device comprising information as to how this interfering device must stop making these modifications.

In the case where the device 300 cannot determine whether the interfering device uses a modified version of the IEEE 802.11 standard, or if the device 300 determines that the interfering device is not using a modified version of the IEEE 802.11 standard, then the device 300 does not modify its operating parameters and thus keeps those describing the management of the contention window in accordance with IEEE 802.11.

It should be noted that the present document considers a frequency band comprising a plurality of channels available for establishing communications according to IEEE 802.11. A plurality of frequency bands may be considered, each frequency band comprising a plurality of channels, the method described previously, particularly step 415 of changing channel, being able to apply to the sum of the plurality of channels of the various frequency bands.

The present description envisages particularly the case of a device using communication means in accordance with IEEE 802.11 and being subject to interferences coming from devices using a communication standard of the LTE type. The method may be implemented in any method for access to a medium of the carrier sense multiple access (CSMA) type based on a founding principle that equipment wishing to send a message over the medium must check whether the medium is available before sending the message (the principle of listen before talk (LBT)). The method is advantageously implemented if a method known as "back-off exponential" is used, a method based on the use of a "contention window". Thus the method for access to a medium may be used for any shared medium, for example a medium of the wireless type.

The method for access to a wireless communication medium may be used for devices using communication means in accordance with the LTE-U and LTE-LAA (cat3 or cat4) standards.

The method for access to a communication medium may be adapted to a wireless medium of the shared type, for example of the Ethernet type.

The invention claimed is:

1. A method for access to a wireless communication medium, the access being of the "carrier sense multiple access" (CSMA) type, wherein a device, referred to as the sending device, wishing to send a message over said medium checks whether said medium is available before sending said message, the medium being busy when a signal coming from another device and detected by said sending device has a power higher than a predetermined power threshold, wherein the method comprises, when it is executed by a first device, the following steps of:
   determining a proportion of a first observation period during which the first device detects an interfering signal with a power higher than said power threshold, the interfering signal being sent by a second device accessing the medium,
   if said proportion is higher than a predefined value, then modifying the value of the power threshold by lowering it.

2. The method according to claim 1, the method for access to the communication medium using a contention window, with a size that may vary between an initial size and a maximum size greater than the initial size, for sending a message, each message sent according to the medium-access method by the sending device comprising a preamble, the interfering signal not corresponding to such a message comprising a preamble, the method comprising the following subsequent steps:

determining, during a second observation period, a first cumulative duration during which the interfering signal is detected on the medium with a power higher than the modified value of the power threshold, determining, during the second observation period, a second cumulative duration during which the size of the contention window is greater than its initial size, and determining the type of the interfering signal by comparison of the first cumulative duration and the second cumulative duration.

3. The method according to claim 2, the method for access to the communication medium comprising a step of acknowledgement of a sent message, the method for access to the communication medium comprising the following subsequent steps:

determining a mean duration that elapses between a moment where the first device takes a decision to send a message and a moment where said message is acknowledged, if the value of the mean duration is greater than a predefined value, and, if the previously determined interfering signal is of a first predetermined type, then modifying management of the contention window used, so as to fix the size of the contention window or to reinitialise the size of the contention window to its initial value when a predefined size is reached.

4. The method according to claim 3, the method for access to the communication medium further comprising the following steps:

if the value of the mean duration is greater than a predefined value and if the previously determined interfering signal is not of said first type, then sending a message to a third device, the message comprising a request for information on the implementation the method for access to the communication medium by the second device, and determining, from a message received in response to said message comprising a request for information, whether the source of interference uses the present method for access to a communication medium.

5. The method according to claim 4, the third device being the same device as the second device or a another device, referred to as a server, comprising a data base, the data base comprising a list of at least one device present in a near environment of the third device, each device in the list being associated with a type of method for access to the medium.

6. The method according to claim 5, the medium being a medium of a radio type.

7. The method according to claim 6, the method for access to the communication medium being in accordance with a communication standard of the IEEE 802.11 type as long as the power threshold or the management of the contention window is not modified.

8. The method according to claim 3, the method for access to the communication medium further comprising the following steps:

when the power threshold or the management of the contention window is modified, sending a message indicating that interference has been detected on the medium, the message comprising the modified value of the power threshold or an indication of the modification of the contention window, and the sending of the message taking place periodically or following the reception of a request.

9. A device comprising means for access to a wireless communication medium, the access being of the "carrier sense multiple access" (CSMA) type, in which a device, referred to as the sending device, wishing to send a message over said medium, checks whether said medium is available before sending said message, the medium being busy when a signal coming from another device and detected by said sending device has a power higher than a predetermined power threshold, wherein the device comprises circuitry configured for:

determining a proportion of an observation period during which the device detects an interfering signal with a power higher than the power threshold, the interfering signal being sent by another device accessing the medium, and modifying the value of the power threshold by lowering it if this proportion is higher than a predefined value.

10. A non-transitory computer readable medium comprising computer executable instructions embodied in the non-transitory computer readable medium that when executed by at least one processor of at least one computer cause the at least one computer to perform steps comprising:

determining a proportion of a first observation period during which the first device detects an interfering signal with a power higher than said power threshold, the interfering signal being sent by a second device accessing the medium, if said proportion is higher than a predefined value, then modifying the value of the power threshold by lowering the power threshold.

* * * * *